UNITED STATES PATENT OFFICE.

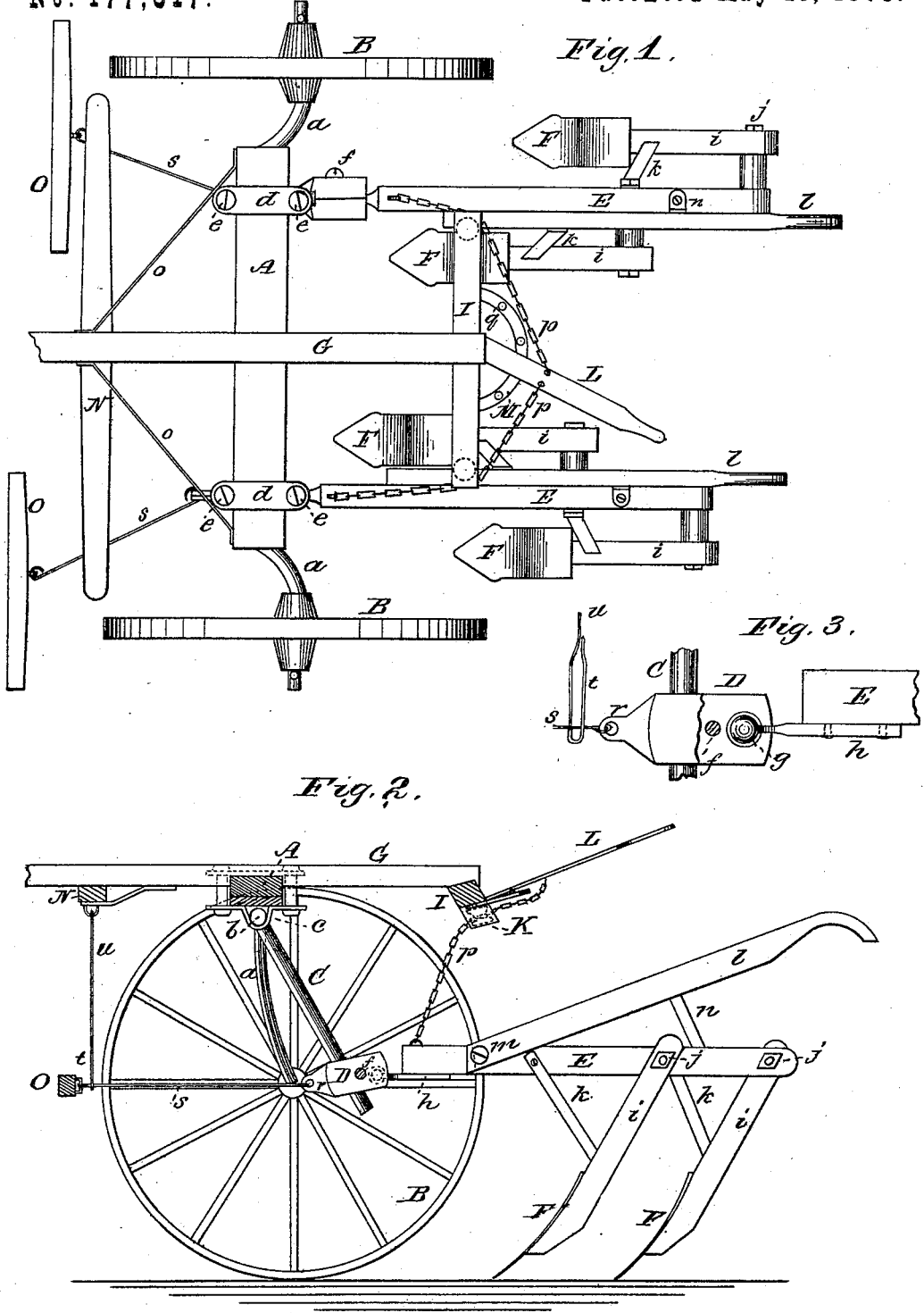

GLAUCUS BARCAFAR, OF SPRINGFIELD, OHIO.

IMPROVEMENT IN CULTIVATORS.

Specification forming part of Letters Patent No. 177,317, dated May 16, 1876; application filed March 27, 1876.

*To all whom it may concern:*

Be it known that I, GLAUCUS BARCAFAR, of Springfield, in the county of Clarke and State of Ohio, have invented a new and valuable Improvement in Cultivators; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a top-plan view of my invention. Fig. 2 is a side elevation, partly in section. Fig. 3 is a detached view, on an enlarged scale, of the ball-and-socket joint.

This invention has relation to plow-cultivators; and consists in constructing the several parts so as to enable a direct draft to be obtained from the point of each plow, and to allow of the horses stepping sidewise without changing line of draft, and also to give a perfect movement to the plows in all directions, and at the same time keep a uniform depth, and not be raised by the wheels passing over uneven surface of the soil, the construction, arrangement, and combination of the several parts by which the above results are accomplished being hereinafter described, and subsequently pointed out in the claims.

In the drawings, A represents the axle-bar, to the ends of which are bolted, or otherwise secured, the rods $a$, forming the axles for the wheels B. Near the ends of the axle-bar A are guide-posts C, the upper ends of which have journals $b$ working within boxes $c$, said boxes secured to the bar A by clamping-plates $d$ and bolts $e$. This arrangement admits of the posts C having a swinging motion, which is considered of great advantage over a rigid post, as it relieves the strain upon the horses neck, as well as holding the plow in position. Connected to the posts C by bolts $f$ are sectional boxes D, each half of said box having a hemispherical socket for the reception of a ball, $g$, upon the end of plate $h$, said plates being connected to the under side of beams E, to which are secured the standards $i$, by the bolts $j$ and brace-rods $k$, said standards carrying shovels F; handles $l$ are also secured to the beams E by bolts $m$ and brace-rod $n$. The ball-and-socket joint, as represented at D $g$, admits of a perfect movement to the plows in all directions, and enables them to keep a uniform depth, however uneven the surface of ground may be. The plows can be adjusted, when required, to the desired depth by loosening the bolts $f$ and slipping the sectional box D either up or down upon the posts C. Connected to the axle-bar A by brace-rods $o$ is a central beam, G, and to one end of said beam is a cross-bar, I, carrying upon each end hooded sheave K, through which chains $p$ pass, one end of said chains being connected to the beams E and the other ends to a pivoted lever, L. A semicircular plate, M, with stops $q$ for holding the lever in place, enables the draft to be changed when coming to a hillside by moving the lever in a direction away from the horse upon the lower side of the hill, thereby shortening the chain to his plow and lengthening the other, giving him the wagon, and keeping the same from getting down out of place, the levers in the center equalizing the draft, and thereby enabling the hilly ground to be plowed without sliding down, as is frequently the case where the plows are rigidly connected to the wagon and both horses pulling equally. The boxes D are formed with eyes $r$, to which the inner ends of draw-bars $s$ are secured, said draw-bars passing through loops $t$ of the swinging rods $u$, the latter secured to the ends of an evener, N. These draw-bars may be either straight or curved, and have secured to their ends whiffletrees O. The purpose of the looped and swinging rods $u$ is to admit of the horses walking over uneven ground without changing the position of the wagon or producing any additional weight upon their necks, it also allowing the horses to step sidewise without changing line of draft from point of plow.

I do not wish to be understood as claiming, broadly, a ball-and-socket connection for plow-beams; but What I do claim as new, and desire to secure by Letters Patent, is—

1. In a wheel-cultivator, the combination of the swinging posts C with the arched axle A $a$, and with the plow-beam coupling D $g$, substantially as and for the purpose set forth.

2. The double-tree N, swinging rods $u$, with loops t, and draft-rods s, in combination with the swinging posts C, ball-and-socket joint D g, and plow-beams E, having a draft longitudinally independent of each other and of the axle, substantially as and for the purpose specified.

3. The combination with the plows, connected to the swinging posts C by the ball-and-socket joint, consisting of the sectional boxes D and the plates h, with balls g, of the cross-bar I, carrying upon each end hooded sheaves K, and the chains p, pivoted lever L, and semicircular plate M, with stops q, substantially as and for the purpose set forth.

In testimony that I claim the above I have hereunto subscribed my name in the presence of two witnesses.

GLAUCUS BARCAFAR.

Witnesses:
   J. J. SMITH,
   T. I. PRINGLE.